May 26, 1970     C. O. LASSY     3,514,092

WORKPIECE HOLD-DOWN JAWS

Filed Oct. 25, 1966     3 Sheets-Sheet 1

Carl O. Lassy
INVENTOR.

BY *[signatures]*
Attorneys

May 26, 1970   C. O. LASSY   3,514,092
WORKPIECE HOLD-DOWN JAWS
Filed Oct. 25, 1966   3 Sheets-Sheet 2
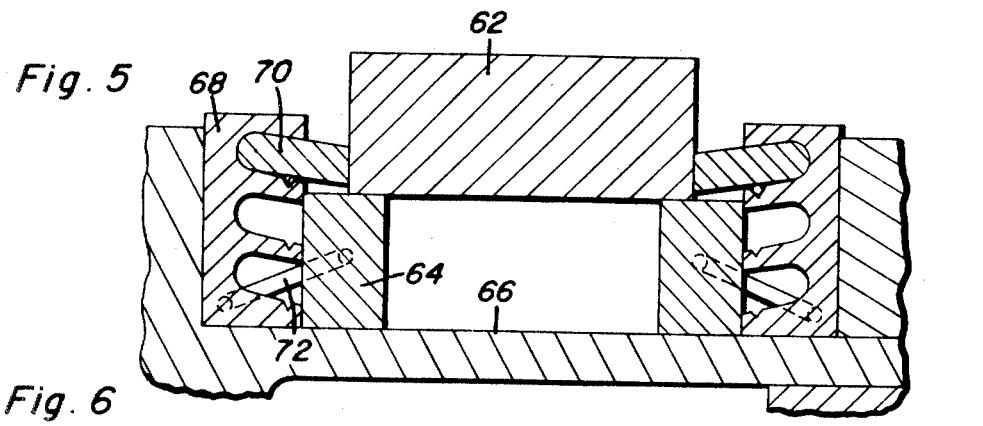
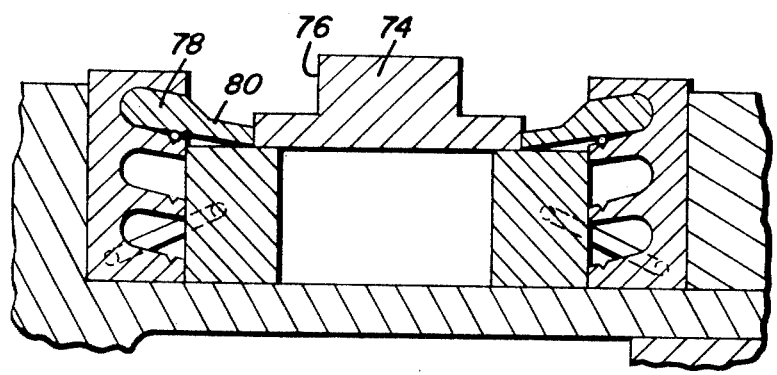
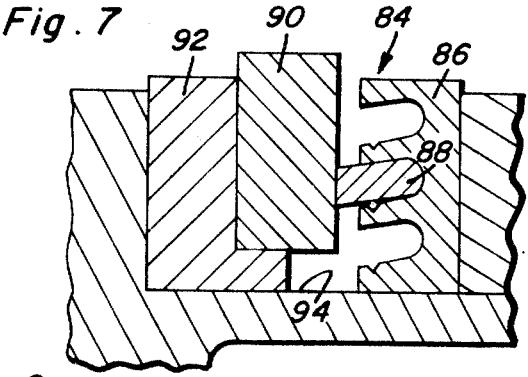
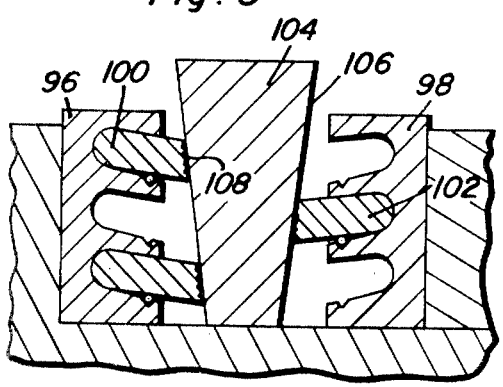
Carl O. Lassy
INVENTOR.
BY
Attorneys May 26, 1970 C. O. LASSY 3,514,092
WORKPIECE HOLD-DOWN JAWS
Filed Oct. 25, 1966 3 Sheets-Sheet 3

Carl O. Lassy
INVENTOR.

BY *Clarence A. O'Brien*
and *Harvey B. Jacobson*
Attorneys

United States Patent Office 3,514,092
Patented May 26, 1970

3,514,092
WORKPIECE HOLD-DOWN JAWS
Carl O. Lassy, Bristol, Conn.
(% Lassy Tool Company, Plainville, Conn. 06062)
Filed Oct. 25, 1966, Ser. No. 589,269
Int. Cl. B23q 3/02, 3/06
U.S. Cl. 269—134                    10 Claims

ABSTRACT OF THE DISCLOSURE

A workpiece holder including a bed and a pair of upstanding opposed jaws mounted thereon with at least one jaw being movable in relation to the other. At least one jaw is provided with means exerting a downward force on the workpiece when the jaws are moved towards each other into clamping engagement with the workpiece. The means exerting downward force includes pawls which are removable for interchangeability thereof or corresponding inclined surfaces separated by anti-friction rollers.

---

The present invention generally relates to clamping jaws for a workpiece which may be employed in conjunction with vises or other apparatuses used in holding workpieces when some machining or other work operation is performed on the workpiece and has for its primary purpose the introduction of a downward force exerted on the workpiece when the workpiece is being clamped by the jaws for biasing the workpiece downwardly against a supporting surface such as the bed of a vise.

One of the problems existent in presently available workpiece holding vises and other similar gripping devices is the necessity of positioning the workpiece solidly down against a reference surface which is usually accomplished by tapping on the workpiece with a hammer or similar instrument. This requires the expenditure of considerable time inasmuch as each workpiece gripped by the vise must be hammered into lace and quite frequently, such hammering will damage the workpiece. Such damage is possible to each workpiece as it is tapped down to properly seat the workpiece against the bed of the vise or other bottom surface provided by the gripping device. The present invention eliminates the possibility of work damage due to hammering or tapping downwardly and also eliminates the waste of time of the operator which is necessary in the hammering or tapping of the workpiece downwardly. This is accomplished by providing a structure whereby the gripping jaws will automatically exert a downward force on the workpiece for automatically holding the workpiece securely down against the bed of the vise or other reference surface provided for the workpiece.

Another problem existent in the gripping of workpieces is the necessity of providing specially shaped gripping jaws for gripping a particular workpiece and which requires the removal of the gripping jaws and installation of the specially shaped gripping jaws. The present invention effectively solves this problem by incorporating structural features which enable the gripping jaws to be readily removed and replaced with other gripping jaws with the least possible expenditure of time.

Another important feature of the present invention is to provide an automatic hold-down jaw assembly for vises and the like which exerts a downward force on a workpiece clamped thereby together with parallels clipped onto the jaws for providing a support for workpieces elevated above the bed of the vise.

Still another feature of the present invention is to provide hold-down jaws which are full face jaws supported by a plurality of downwardly inclined pivotal pawls in which the full face jaws are retained in assembled relation by spring clip structures.

Yet another object of the present invention is to provide workpiece hold-down jaws in which the movable jaw is supported from a supporting member by providing a plurality of roller bearings orientated in engagement with inclined surfaces so that clamping pressure exerted by the jaws will introduce a vertical component of movement and force on the gripping jaws thus biasing the workpiece downwardly.

A further important feature of the present invention resides in the provision of hold-down jaws for gripping workpieces in which pivotal hold-down pawls are directly engaged with a workpiece with the shape and configuration of the pawls being varied to enable secure gripping and hold-down of irregular shaped workpieces.

Yet another important object of the present invention is to provide workpiece hold-down clamping jaws having compensating inserts associated therewith which grip a workpiece at particular locations to compensate for workpiece variations such as may be found in castings or forgings.

It is also a significant object of the present invention to provide hold-down clamp jaws for various workpiece clamps which will automatically exert a downward force on the workpiece when the clamping jaws are brought into clamping engagement with the workpiece in which the structure is extremely versatile and adaptable for various uses and is rugged and long lasting and may be manufactured rather inexpensively and in quantity with the structure being readily interchangeable with similar structures or for replacement thereby introducing improvements in the hold-down of workpieces from not only the aspect of holding the workpiece but also saving time of the operator and eliminating the possibility of damage to the workpiece as frequently occurs in present day practice.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a sectional view similar to FIG. 1 of an arrangement in which parallels support the workpiece with the hold-down pawls retaining the workpiece against the parallels and the parallels being retained in position by springs engaging the base section of the gripping jaw;

FIG. 6 is a sectional view similar to FIG. 5 but illustrating another type of hold-down pawl associated with a different type of workpiece;

FIG. 7 is a sectional view illustrating a single base section and a single pawl engaging a workpiece on one side thereof for biasing the workpiece downwardly against a parallel;

FIG. 8 is a sectional view illustrating another arrangement of pawls in which the dimensional characteristics thereof may vary for engaging opposite sides of irregular workpieces;

Figure 13:
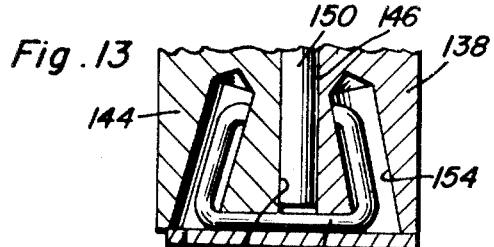
Figure 14:
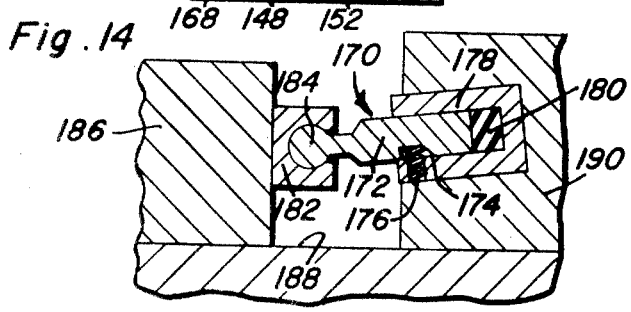

FIG. 13 is an enlarged fragmental sectional view illustrating the manner in which the clip springs are associated with the bores which receive them and also the orientation of the roller bearings between the base section and movable section of the hold-down jaw; and FIG. 14 is a sectional view illustrating a hold-down insert having a compressible material to enable compensation for irregularities in the surface of the workpiece.

Referring now specifically to the drawings, the workpiece hold-down jaws are generally designated by the numeral 20 and are illustrated in use with a vise generally designated by the numeral 22 for holding a workpiece 24. The vise may be of any suitable construction and includes relatively movable jaws 26 and 28 with the jaw 26 usually being stationary and the jaw 28 being movable in relation thereto with a suitable actuating mechanism 30 employed for moving the movable jaw 28 in relation to the stationary jaw 26. The vise 22 also includes a precision surface such as the base surface or bed 32 on which the workpiece 24 rests and which forms a precision reference surface for accurately retaining the workpiece 24 in position during some machining operation or work operation on the workpiece 24.

Each hold-down jaw 20 includes a base section 34 which is stationarily supported in relation to either the stationary jaw 26 or the movable jaw 28 in any suitable manner such as by bolts, pins or the like depending upon the existing vise structure with the base section 34 being attached to the vice jaws in the same manner as the usual pads provided on the vise jaws. Movably supported in relation to the base section 34 is a movable section or gripping member 36 which actually engages the workpiece 24 and as illustrated in FIGS. 1–4, the movable section 36 is a full face gripping jaw or member for gripping the workpiece 24 over the complete surface of the gripping member 36.

The face of the base section 34 adjacent the gripping member 36 is provided with a plurality of laterally extending channels or grooves 38 which are inclined inwardly and upwardly and terminate in a semi-cylindrical rounded inner surface 40. In matching relation to the channels or grooves 38, the movable section or gripping member 36 is provided with similar grooves, channels or recesses 42 which are inclined downwardly and inwardly and terminate in semi-cylindrical end portions 44. The matching pairs of channels, grooves or recesses 38 and 42 receive pawls 46 which have rounded or semi-cylindrical edges received in the rounded inner ends of the channels 38 and 42, respectively. Thus, the pawls 46 interconnect the base section 34 and movable section 36 with each of the pawls 46 being confined downwardly and inwardly so that when horizontal force is exerted between the sections 34 and 36, the movable section 36 will be moved downwardly in relation to the base section 34 and due to the engagement of a movable section 36 in clamping relation to the workpiece 24, the workpiece 24 will be biased downwardly against the bed 32 of the vise 22.

For retaining the movable section 36 and the base section 34 in assembled relation, each end of the sections 34 and 36 of the hold-down jaw 20 is provided with a pair of U-shaped spring clips 48 having the legs 50 thereof received in bores 52 provided in the end walls of the stationary base section 34 and the movable gripping section 36.

Figure 1:
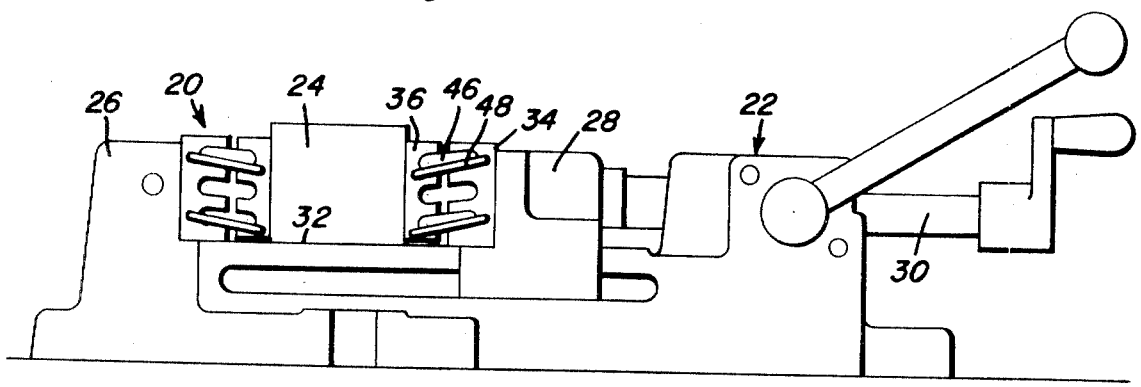
FIG. 1 is a side elevational view of a workpiece holding vise illustrating the automatic hold-down jaws of the present invention incorporated therein.
Figure 2:
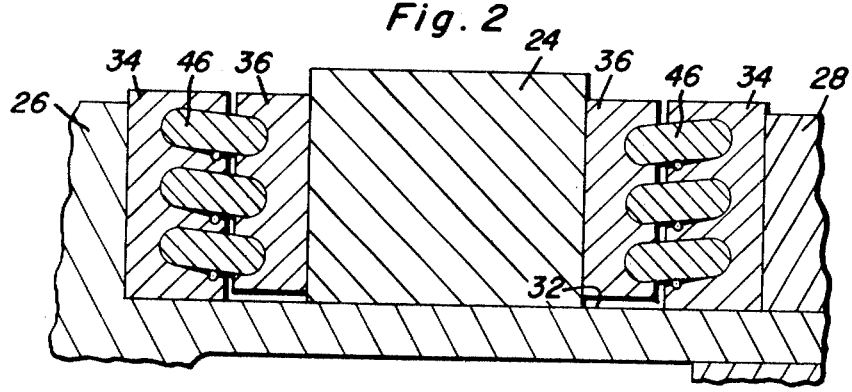
FIG. 2 is a sectional view, on an enlarged scale, taken longitudinally of the vise and transversely of the hold-down clamp jaws of the present invention illustrating the relationship thereof to the workpiece.
Figure 3:
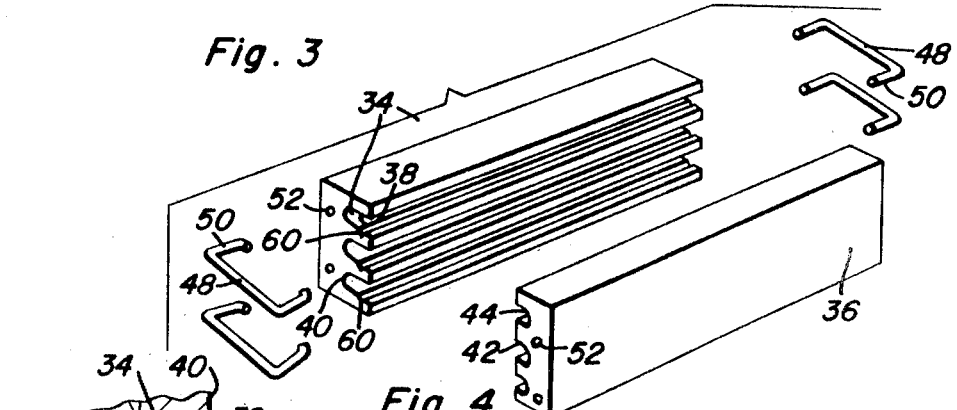
FIG. 3 is an exploded perspective view illustrating the relationship of the movable section of the hold-down jaw to the stationary or base section with the clip springs also illustrated.
Figure 4:
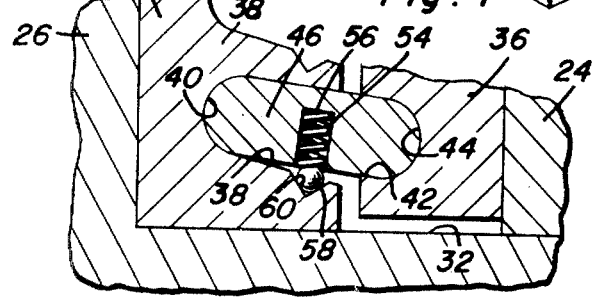
FIG. 4 is a fragmental sectional view, on an enlarged scale, illustrating a pawl with a spring detent structure to automatically retain the pawls in their uppermost position when force is not being exerted on the gripping jaw.

For biasing the pawls 46 to an upper position so that the movable section 36 will normally be retained in an elevated position in relation to the bed 32 of the vise, the undersurface of each pawl 46 is provided with a bore 54 receiving a coil compression spring 56 and a ball detent 58 which is engaged in a V-shaped notch or recess 60 formed in the bottom wall of the channel or groove 38. As illustrated in FIG. 4, the top and bottom walls of the channel 38 diverge so that in the normal elevated position of the gripping member 36, the bottom surface of the pawl 46 will diverge from the bottom surface of the channel 38 by virtue of the spring pressure exerted by the spring 56 and this divergence also enables the pawls 46 to pivot downwardly while maintaining a parallel relation to each other as the gripping member 36 moves downwardly in relation to the stationary base section 34.

The downward inclination of the grooves 38 which receive the hold-down pawls 46 provides a structure which prevents the hold-down pawls 46 from jackknifing upwards inasmuch as the upper surface of the hold-down pawls 46 will engage the upper surface of the groove or channel 38 and be retained in a downwardly inclined relation as illustrated in FIG. 4. The three slots or grooves 38 are identical and are on a downward angle of approximately 5° with the inner edge thereof being rounded or radiused with the bottom surface of the slot 38 tapering at approximately a 5° greater angle than the upper surface of the slot 38 with this taper of the bottom surface of the slot beginning at the radiused inner end thereof. This divergence or tapering of the bottom surface at approximately 5° provides for downward pivotal movement of the hold-down pawl 46 and also enables vertical movement of the hold-down jaw section 36. The V-shaped slot 60 which runs the entire length of the bottom surface of all three slots 38 enables the hold-down pawls 46 to be easily removed and also biased to an upper position. The removability of the pawls 46 enables pawls of various shapes or lengths to be readily inserted into the slots 38 for housing the hold-down pawls securely and firmly in place yet allowing proper motion as required and easy interchangeability. By employing the spring and ball detent 56 and 58, the hold-down pawl can consist of one piece running the entire length of the sections 34 and 36 or can consist of a number of segments varying in width and length as requirements dictate which is of great importance and value and adds to the varied number of workpieces that can be held with this structure. The fact that the hold-down pawls 46 can consist of a number of individual segments, each segment to adjust independent of each other, allows for greater gripping of work as when a workpiece with uneven surfaces, as a casting or rough piece of steel, is held. The pawl 46 first engaged is free to move downwardly which automatically shortens this pawl because of the angle involved thereby allowing other pawls to engage or grip the workpiece.

In FIGS. 1–4, the full face hold-down jaws or movable sections 36 are held in their upward position by the clip spring 48 as well as by the spring detent and ball assembly. The strength and resilience characteristics of the springs 48 may vary and maintain the movable section 36 in parallel relation and in fixed position.

FIG. 5 illustrates another arrangement in which a workpiece 62 rests on parallels 64 engaging the bed 66 of the vise structure. The base section 68 of a hold-down jaw is the same as the base section 34 in FIGS. 1–4 but in this construction, only a single hold-down pawl 70 is employed and engaged with the side surfaces of the workpiece 62 for biasing the workpiece 62 downwardly against the upper surface of the parallels 64. In this construction, the parallels 4 are retained against the inner surface of the stationary section 68 by spring clips 72 similar to the spring clips 48. The spring clips 72 are placed on an angle to retain the parallels 64 firmly down against the vice bed to preclude the possibility of chips getting under and between the bottom of the parallel 64 and the vise bed 66. Parallels of various heights and widths can be readily used as the job requires.

FIG. 6 illustrates a structure quite similar to FIG. 5 but in this construction, a workpiece 74 is gripped which has recesses or the like 76 formed in the corners thereof thus requiring a hold-down pawl 78 having a recess 80 formed in the upper surface thereof where it engages the workpiece 74 thereby eliminating any possible interference with the tool operating on the workpiece when the recesses 76 are being formed.

FIG. 7 illustrates another arrangement in which only a single hold-down jaw 84 is employed which includes a base section 86 comparable to the base sections 34 and 68 with only a single centrally disposed hold-down pawl 88 being employed and engaging one surface of a workpiece 90. The opposite surface of the workpiece 90 and the undersurface thereof is engaged by a parallel 92 which rests on the vise bed 94 and against one of the jaws of the vise so that as the jaws of the vise move together, a downward force will be exerted on the workpiece 90 by the hold-down pawl 88.

FIG. 8 illustrates another arrangement in which oppositely disposed base sections 96 and 98 are provided with two hold-down pawls 100 being employed in the base section 96 and a single pawl 102 employed in the base section 98 with the pawls 100 being disposed in the uppermost and lowermost slot formed therein and the pawl 102 disposed in the intermediate slot for gripping opposed surfaces of a workpiece 104 which may be downwardly converging opposed surfaces 106. The edges of the pawls 100 and 102 which engage the workpiece 104 are inclined and serrated or roughened as at 108 for effectively gripping the surfaces 106 of the workpiece 104.

Figure 9:
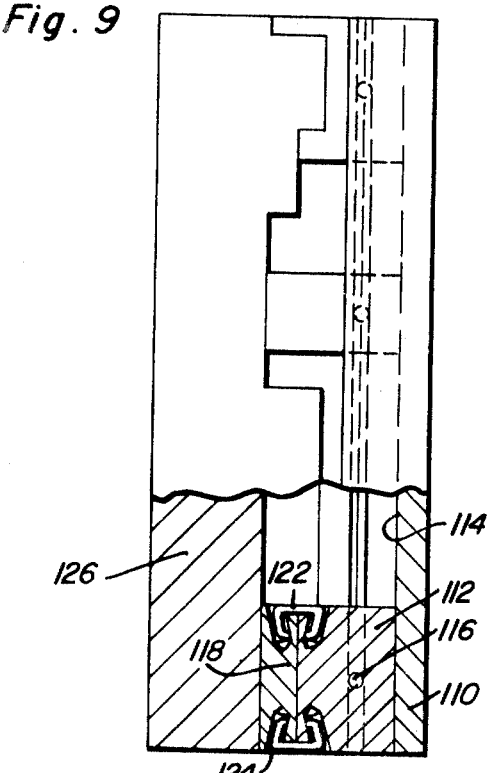
FIG. 9 is a plan view, with portions in section illustrating hold-down pawls with pads spring-clipped thereto for enabling the pads to pivot in relation to the pawls for automatic alignment with and engagement with the face of the workpiece.
Figure 10:
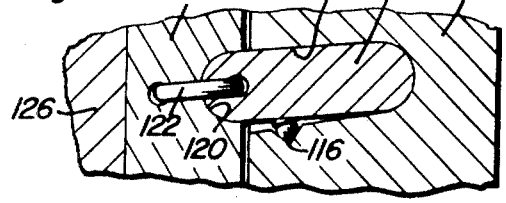
FIG. 10 is a sectional view of the construction of FIG. 9 illustrating the relationship between the base section, hold-down pawls and workpiece engaging pads.

FIGS. 9 and 10 illustrate a base section 110 having a plurality of segmental pawls 112 oriented in the slots 114 therein with the pawls 112 being urged to their upper position by the spring and ball detent assembly 116 and the pawls 112 receive a work-engaging pad 118 having a rounded groove 120 pivotally supporting the pads on the pawls. The pad 118 is secured to the pawl 112 pivotally by spring clips 122 received in bores 124 in generally the same manner as the spring clips 48. The pads 118 prevent marring of the surface of the workpiece 126 and especially prevent marring of finished work surfaces inasmuch as the work shoes or pads 118 automatically pivot into alignment with the face of the workpiece 126.

The holes which receive the converging legs of the clip springs are angled towards each other approximately 10° to prevent the clip springs from becoming dislodged regardless of vibration or use. The angled holes are slightly larger than the diameter of the spring allowing the spring to be readily snapped into place or removed and allowing for flexing motion of the spring during movement of the hold-down pawls, the hold-down gripping section of the hold-down jaw or the parallels. The motion of a movable section, pawls or parallels never exceeds the allowable motion which is provided by the clip springs. The spring clip method of attachment also anchors the parallels in position and provides versatility and flexibility of various set-ups employed in manufacturing techniques.

Figure 11:
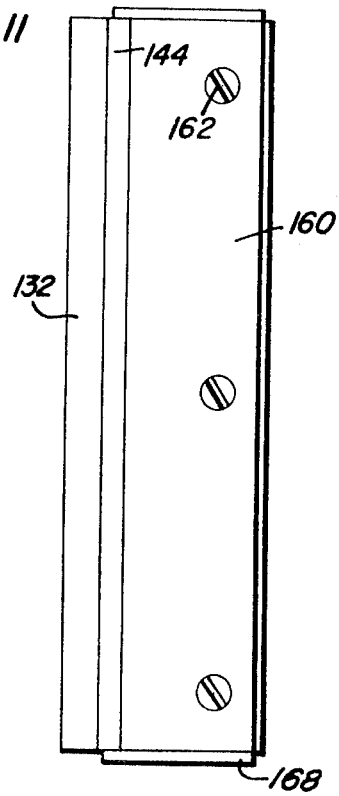
FIG. 11 is a plan view of a workpiece hold-down jaw in which the movable section of the jaw is supported from the base section by a plurality of roller bearings.
Figure 12:
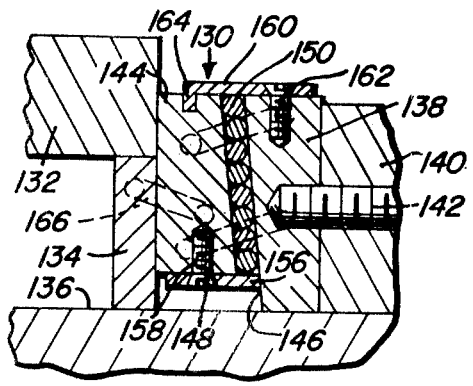
FIG. 12 is a sectional view of the construction of FIG. 11 illustrating the roller bearing structure for supporting the movable section of the hold-down jaw.

FIGS. 11-13 illustrate a roller bearing type of hold-down jaw generally designated by numeral 130 for holding a workpiece 132 against a parallel 134 which rests against the vise bed 136. A stationary base section of the hold-down jaw 130 is designated by numeral 138 and is secured to the jaw 140 of a conventional vise by a conventional cap screw 142 or the like which also may be the same method of attaching the other embodiments of the invention to the vise jaw. The movable or gripping section of the hold-down jaw 130 is designated by numeral 144. The inner surface of the stationary section 138 of the movable jaw 130 is provided with an upwardly and inwardly inclined surface 146 which is in parallel but spaced relation to an inclined surface 148 on the movable section 144 of the hold-down jaw 130. Disposed between the inclined surfaces 146 and 148 is a plurality of roller bearings 150. The movable section 144 is retained in position in relation to the stationary section 138 by a pair of spring clips 152 received in inwardly converging bores 154 as illustrated in FIG. 13 with the position of the roller bearings 150 also being illustrated in that figure. A lower retaining plate 156 is attached to the movable section 144 by a screw-threaded fastener 158 for engaging the lowermost roller bearing 150 and retaining it in position. A top retainer plate 160 is attached to the stationary base section 138 by a fastener 162. The edge of the upper retaining plate 160 which extends inwardly into overlying relation to the upper end of the movable section 144 is provided with a downturned edge portion 164 which is received in a corresponding groove in the movable section 144 to enable downward movement of the movable section 144 during a clamping operation. Also, the parallel 134 is connected with the movable section 144 and angled in such a way that the parallel 134 is urged against the vise bed 136 by clip springs 166.

The roller bearing type of hold-down jaw 130 provides a jaw with downward motion when the workpiece 132 is clamped. The jaw faces are always parallel to the workpiece being held with the face extending from the top of the fixed jaw section to within approximately $\frac{3}{16}''$ of the bottom surface of the fixed jaw section 138 which allows for downward motion of the movable jaw section 144. The roller bearings 150 facilitate and assure downward motion bringing the workpiece 132 onto parallel 134 or vise bed 136 thus automatically compensating for any upward movement of the movable jaw of the vise due to imprecision or wear. Another advantage of the roller bearing hold-down jaw 130 is that the workpiece 132 can be held in the extreme top portion of the vise without the possibility of the hold-down jaws tipping inward at the bottom with resulting action of releasing the workpiece. The top plate 160 actually serves as a dust cap which has a depending edge to prevent chips or foreign matter from getting into the rollers and this also acts as a stop and retainer for the rollers and a limit for the upper position of the movable section 144 in relation to the stationary section 138. The retaining plate 156 on the movable jaw section 144 which not only serves as a retainer for the roller but also serves as a chip shield. Thus, as pressure is applied to the workpiece when the vise is clamped, the movable section 144 of the hold-down jaw 130 is free to move downwardly against the work while the fixed section of the movable hold-down jaw is free to move in an upward direction automatically compensating for the amount of looseness in the sliding jaw of the vise structure. Side cover plates such as at 168 may be attached to each end of the fixed section of the hold-down jaws 130 with screws or the like for maintaining the rollers and the movable sections in place and sealing the ends against chips or foreign matter. The end plates are placed in position against the underside of the top plate with the movable section 144 in extreme top position with the overhanging edge of the top plate serving to seal against entry of chips. The end plate has been omitted in FIG. 13 for clarity.

The roller bearing type hold-down jaws are relatively inexpensive to manufacture and can be used in pairs or singly and will assure effective workpiece clamping without hammering the workpiece downwardly and are self-contained and will remain accurate for an extended period of time. All types of workpieces can be held fully in the device or gripped by the extreme upper portions of the jaw without marring the work.

If desired, auxiliary jaws may be attached to the surface of the hold-down jaw 130 providing step jaws of desired height firmly attached to the hold-down jaws thus assuring true accuracy and eliminating bothersome loose parallels or blocks commonly used that do not stay in place and allow chips to get between the bottom surface and the vise bed. In this construction, the parallels travel with the movable jaw and are always in place and are firmly held against the vise bed eliminating the possibility of chip problems and are readily changed to provide desired height by simply removing the spring clips which retain the parallels in place and then inserting parallels of a desired height and snapping the retaining clips back in place.

FIG. 14 illustrates a compensating insert construction generally designated by the numeral 170 and which includes a round pin 172 having a notch or groove with one inclined surface formed in the pin as at 174 to enable the pin 172 to be pulled outwardly by compressing a retaining spring 176. The pin is received in an insert housing 178 and the spring 176 has a ball detent at the upper end thereof for enabling the pin 172 to be easily removed. A block of compressible resilient material 180 is disposed between the inner end of the housing 178 and the inner end of the pin 172 to enable inward movement of the pin 172 by compressing the compressible material 180 in an obvious manner. The other end of the pin 172 is provided with a pivoted pad 182 that is crimped around a rounded head 184 on the pin 172 to enable pivotal movement of the pad in relation to the pin. As illustrated, the longitudinal axis of the pin 172 is downwardly inclined for exerting a downward force on the workpiece 186 for urging the workpiece downwardly against the bed 188 of the vise. The housing 178 is retained in the vise jaw 190 in any suitable manner and the ball detent and flat milled side of the pin enable the pin to be easily removed when desired and the pin may be tapered which allows some degree of movement of the pin in relation to the pin housing so that the downward force may be exerted on the workpiece. The compensating inserts 170 may be constructed inexpensively and can be made with a face parallel to the face of a vise jaw 190 or provided with a pivotal pad crimped onto the ball end of a tapered pin insert. This construction enables automatic compensation for workpiece variations such as found in castings or forgings to provide automatic firm grip on each surface or surfaces. Of course, the compensating pins may be incorporated into a fixture for holding a plurality of workpieces if desired and by removing the pins, other pins can be inserted as deemed appropriate for a particular job requirement.

In use, the vise is tightened in the usual manner and the hold-down jaws or hold-down pawls will automatically hold the workpiece down against the bed of the vise or parallels and will prevent the work from rising which would normally occur due to wear in the vise structure and normal looseness that will be found therein. The hold-down jaws or pawls can be used in pairs or singularly with various parallels employed in combination therewith so that the workpiece can be retained in the optimum position depending upon the work to be performed thereon and the size of the workpiece. The hold-down jaw may be employed in various workpiece clamping devices such as lathe chucks and the like where it is desired to have the workpiece held against a precision surface while some operation is being performed theron. The hold-down pawls or jaws may be provided with serrated gripping surfaces, inclined gripping surfaces, relatively thin gripping surfaces or any other desired gripping surface.

The dimensional characteristics and the strength characteristics of the clip springs may be varied depending upon the function which they perform and the components which they interconnect. For example, two spring clips of relatively high strength are employed to hold the full face jaw whereas only one spring of less strength may be employed to hold a parallel in place. The springs for holding the jaw sections are placed at an angle whereby the movable section of the hold-down jaw is always in extreme upward position whereas the spring for the parallel holds the parallel firmly against the work face of the movable hold-down section which serves not only to exert an upward pull against the movable section of the hold-down jaw but also to urge the parallel firmly down against the vise bed thereby preventing chips from getting under and between the bottom of the parallel and the vise bed. Parallels of various heights, shapes and configurations may be employed depending upon the workpiece involved and the work operation to be performed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A workpiece holding device comprising a bed, a pair of opposed jaws mounted on said bed with at least one of said jaws being movable for gripping and releasing a workpiece, at least one of said jaws including a base section, and means mounted on said base section for holding a workpiece and exerting a downward force thereon, said means including at least one pawl means, said base section including a downwardly and inclined recess receiving said pawl means and enabling limited swinging movement thereof, said recess being defined by an upper wall surface precluding upward swinging movement of said pawl means beyond a generally horizontal position and a lower wall surface diverging outwardly from the upper wall surface, means on the pawl means to engage a workpiece to exert a downward force thereon when an inward gripping force is imparted to the pawl means by movement of the base section, and means removably retaining said pawl means in said recess to enable removal and interchangeability thereof.

2. The structure as defined in claim 1 wherein said means removably retaining the pawl means in the recess includes spring-biased detent means interconnecting the pawl means and the lower wall surface of the recess to removably retain the pawl means in the recess and urge the pawl means into engagement with the upper wall surface of the recess.

3. The structure as defined in claim 1 wherein the inner edges of the upper and lower wall surfaces are innterconnected by a radiused surface, said pawl means including a corresponding radiused surface engaged therewith for transmitting forces through the radiused surfaces.

4. The structure as defined in claim 1 wherein said means on the pawl means includes a gripping surface on the free edge thereof extending beyond the base section.

5. The structure as defined in claim 1 wherein said means on the pawl means to engage a workpiece includes a gripping member having a recess therein facing the recess in the base section and receiving the free end of the pawl means.

6. The structure as defined in claim 4 together with means retaining the gripping member articulately associated the pawl means.

7. The structure as defined in claim 6 wherein said articulate connecting means includes spring clips extending between the base section and gripping member to enable limited movement therebetween and retaining the base section, gripping member and pawl means articulately connected.

8. The structure as defined in claim 6 wherein said articulate connecting means includes substantially U-shaped clips interconnecting the gripping member and pawl means for retaining the gripping member on the pawl means.

9. The structure as defined in claim 1 wherein said pawl means includes a plurality of segmental pawls extending from end to end of the base section to enable gripping engagement with a workpiece having irregular surfaces.

10. The structure as defined in claim 1 wherein said pawl means includes a pawl member, said base section including a plurality of vertically spaced recesses therein to enable the pawl member to be positioned in a selected recess and a pawl member oriented in each of the recesses.

References Cited

UNITED STATES PATENTS

| | | | |
|---|---|---|---|
| 1,848,617 | 3/1932 | Friedrich | 269—136 |
| 2,247,656 | 7/1941 | Friedrich | 269—134 |
| 1,692,398 | 11/1928 | Weaver | 269—135 X |
| 2,806,411 | 9/1957 | Backman | 269—136 |
| 2,740,310 | 4/1956 | Larson | 269—136 |
| 3,416,784 | 12/1968 | Wermuth | 269—136 |
| 2,861,492 | 11/1958 | Hokanson. | |

ROBERT C. RIORDON, Primary Examiner

D. D. EVENSON, Assistant Examiner